(12) United States Patent
Hsieh

(10) Patent No.: US 7,517,131 B2
(45) Date of Patent: Apr. 14, 2009

(54) BACKLIGHT MODULE WITH LIGHT GUIDE PLATE HAVING REFLECTIVE STRUCTURES AND LIQUID CRYSTAL DISPLAY WITH SAME

(75) Inventor: Hsiang-Hui Hsieh, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/824,760

(22) Filed: Jul. 2, 2007

(65) Prior Publication Data

US 2008/0002434 A1 Jan. 3, 2008

(30) Foreign Application Priority Data

Jun. 30, 2006 (TW) .............................. 95123839 A

(51) Int. Cl.
*F21V 33/00* (2006.01)
(52) U.S. Cl. ...................... 362/625; 362/626; 362/623; 362/628
(58) Field of Classification Search ................. 362/623, 362/625, 626, 628
See application file for complete search history.

(56) References Cited

U.S. PATENT DOCUMENTS

| 5,779,338 | A  | * | 7/1998 | Ishikawa et al. | ............ | 362/625 |
| 6,454,452 | B1 | * | 9/2002 | Sasagawa et al. | ........... | 362/561 |
| 6,791,638 | B2 | * | 9/2004 | Miyashita et al. | ............. | 349/65 |
| 6,979,112 | B2 |   | 12/2005 | Yu et al. | | |

* cited by examiner

*Primary Examiner*—Laura Tso
(74) *Attorney, Agent, or Firm*—Wei Te Chung

(57) ABSTRACT

An exemplary backlight module (1) includes a light guide plate (10) and a light source (12) arranged to provide light beams to the light guide plate. The light guide plate includes a light emitting surface (102), a bottom surface (102) opposite to the light emitting surface, and a plurality of reflective structures (104) at the bottom surface. The reflective structures substantially define a plurality of isosceles triangular profiles, and each of the reflective structures maintains a pair of base angles relative to the bottom surface. The base angles of each reflective structure are the same, the base angles of all the reflective structures are the same, and the common base angle is in the range from 45° to 55°.

20 Claims, 6 Drawing Sheets

BACKLIGHT MODULE WITH LIGHT GUIDE PLATE HAVING REFLECTIVE STRUCTURES AND LIQUID CRYSTAL DISPLAY WITH SAME

FIELD OF THE INVENTION

The present invention relates to a backlight module that includes a light guide plate having a plurality of reflective structures, and to a liquid crystal display (LCD) that includes the backlight module.

GENERAL BACKGROUND

Liquid crystal displays are commonly used as display devices for compact electronic apparatuses, because they not only provide good quality images but are also very thin. Because liquid crystal in a liquid crystal display does not emit any light itself, the liquid crystal requires a light source to clearly and sharply display text and images. Therefore, a typical liquid crystal display requires an accompanying backlight module.

Referring to FIG. 11, a typical backlight module 9 includes a first diffusing film 91, a first brightness enhancement film (BEF) 92, a second BEF 93, a second diffusing film 94, a light guide plate 95, a reflective film 96, and a light source 97. The first diffusing film 91, the first BEF 92, the second BEF 93, the second diffusing film 94, the light guide plate 95, and the reflective film 96 are arranged in that order from top to bottom. The light guide plate 95 includes a light incident surface (not labeled) adjacent to the light source 97, a bottom surface 952 adjacent to the reflective film 96, and a light emitting surface 954 adjacent to the second diffusing film 94.

In operation, most light beams emitting from the light source 97 are transmitted into the light guide plate 95, and are converted by the light guide plate 95 to a surface light source. The second BEF 93 and the first BEF 92 cooperate to enhance a brightness of the light beams output from the light guide plate 95. However, the need for the first BEF 92 and the second BEF 93 generally adds to the cost of the backlight module 9, and makes the backlight module 9 somewhat thick. Moreover, in assembly of the backlight module 9, a step of aligning and attaching the first BEF 92 and the second BEF 93 is needed. The step is typically performed by manual labor, and adds to the cost of manufacturing the backlight module 9.

What is needed, therefore, is a backlight module that can overcome the above-described deficiencies. What is also needed is a liquid crystal display employing such a backlight module.

SUMMARY

In one preferred embodiment, a backlight module includes a light guide plate and a light source arranged to provide light beams to the light guide plate. The light guide plate includes a light emitting surface, a bottom surface opposite to the light emitting surface, and a plurality of reflective structures at the bottom surface. The reflective structures substantially define a plurality of isosceles triangular profiles, and each of the reflective structures maintains a pair of base angles relative to the bottom surface. The base angles of each reflective structure are the same, the base angles of all the reflective structures are the same, and the common base angle is in the range from 45° to 55°.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale. The emphasis is, instead, placed upon clearly illustrating the principles of different embodiments of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
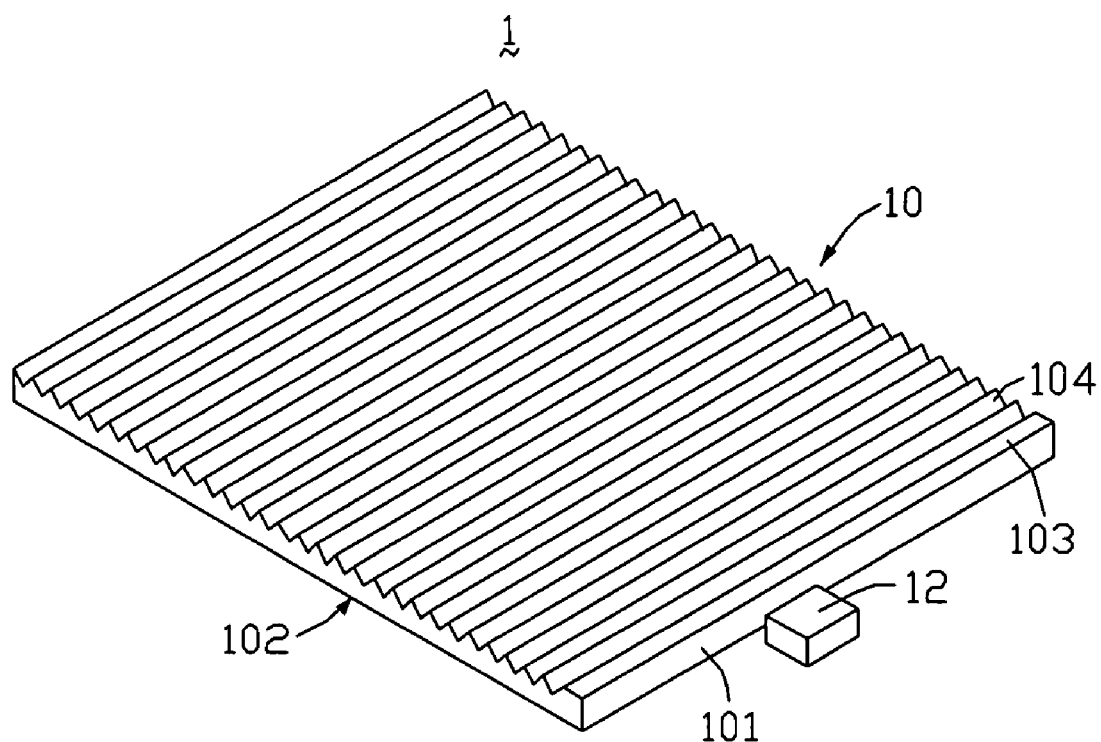
FIG. 1 is an inverted, isometric view of a backlight module according to a first embodiment of the present invention, the backlight module including a light guide plate.

Referring to FIG. 1, a backlight module 1 according to a first embodiment of the present invention includes a light guide plate 10 and a light source 12.

The light guide plate 10 is essentially rectangular. The light guide plate 10 includes a light incident surface 101, a light emitting surface 102 perpendicular to the light incident surface 101, a bottom surface 103, and a plurality of reflective structures 104 integrally formed at the bottom surface 103.

The reflective structures 104 are formed as an integral part of the light guide plate 10, and extend from an inner region of the light guide plate 10 to the bottom surface 103. Each reflective structure 104 has an essentially triangular profile. In the illustrated embodiment, the reflective structures 104 all have the same configuration, are parallel to each other, are parallel to the light incident surface 101, and are continuously arranged one adjacent to the other. A pitch between each two adjacent reflective structures 104 is constant. The light guide plate 10 can generally be made from polycarbonate (PC) or polymethyl methacrylate (PMMA).

The light source 12 is located adjacent to the light incident surface 101 to provide light beams for the light guide plate 10. In the illustrated embodiment, the light source 12 is a light emitting diode (LED), and is located adjacent to a central portion of the light incident surface 101.

Figure 2:
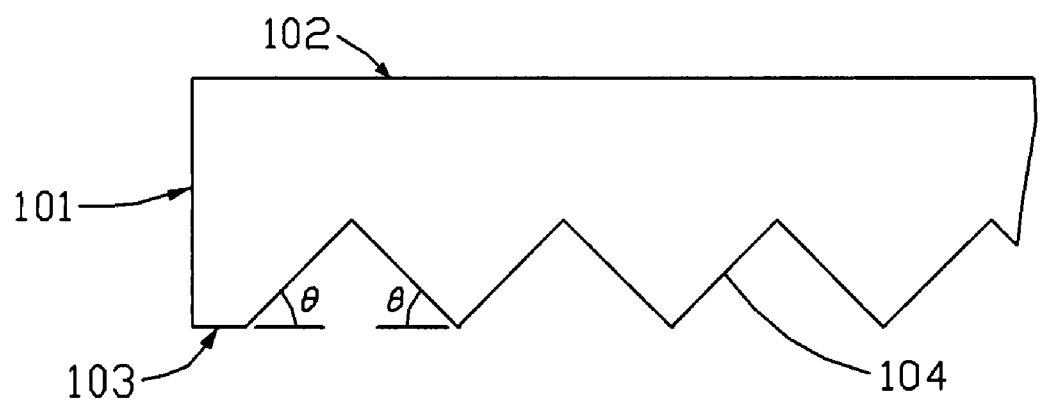
FIG. 2 is an enlarged, side plan view of part of the light guide plate of the backlight module of the first embodiment.

Referring also to FIG. 2, each of the reflective structures 104 maintains a pair of base angles (labeled as theta) relative to the bottom surface 103. The base angles are equal to each other. That is, the reflective structures 104 each have an essentially isosceles triangular profile. The value of the base angles is in the range from 45° to 55°. In a preferred embodiment, the value of the base angles is 50°.

Figure 3:
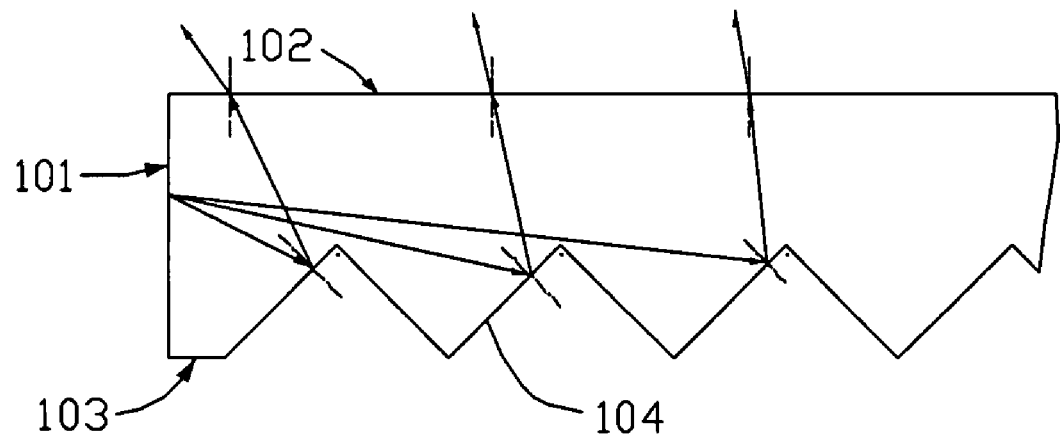
FIG. 3 is similar to FIG. 2, but showing essential optical paths of the light guide plate.

With the above-described configuration of the base angles, the backlight module 1 can achieve an optimum brightness, as has been demonstrated by experiments. In particular, it is understood that the backlight module 1 can achieve a highest brightness when the base angles are 50°. That is, referring also to FIG. 3, when light beams enter the light guide plate 10 through the light incident surface 101 and reach the reflective structures 104, most of the light beams can be reflected in directions generally toward the light emitting surface 102 by the reflective structures 104, and can further efficiently emit from the light guide plate 10 through the light emitting surface 102. Therefore, the brightness of the light beams output from the backlight module 1 can be greatly improved. Moreover, in at least some applications, there is no need for any optical films such as BEFs. In such cases, the backlight module 1 can be efficiently manufactured, and is more compact. Thus, a cost of the backlight module 1 can be greatly reduced.

Figure 4:
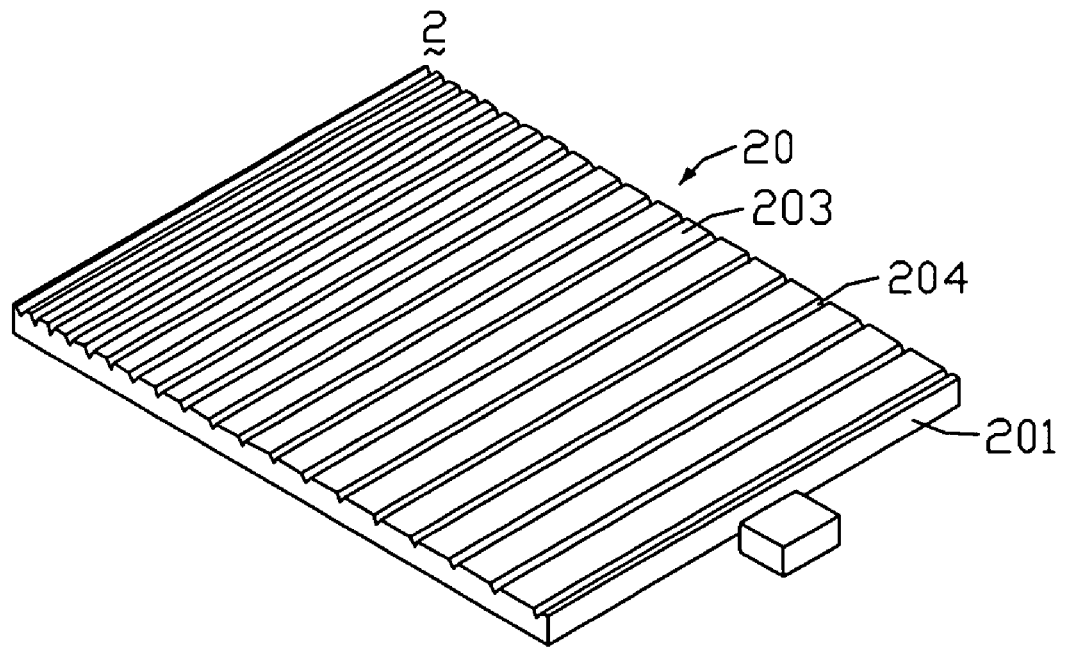
FIG. 4 is an inverted, isometric view of a backlight module according to a second embodiment of the present invention.

Referring to FIG. 4, a backlight module 2 according to a second embodiment of the present invention is similar to the backlight module 1. The backlight module 2 includes a light guide plate 20 and a light source (not labeled). The light guide plate 20 includes a light incident surface 201, a bottom surface 203 perpendicular to the light incident surface 201, and a plurality of parallel reflective structures 204 integrally formed at the bottom surface 203. The reflective structures 204 are discontinuously arranged. In particular, a pitch between each two adjacent reflective structures 204 progressively decreases with increasing distance away from the light incident surface 201.

Because an intensity of light beams that have entered the light guide plate 20 decreases with increasing distance away from the light incident surface 201, the above-described configuration of the reflective structures 204 can help the backlight module 2 achieve uniform light emission. In other respects, the backlight module 2 has advantages similar to those described above in relation to the backlight module 1.

Figure 5:
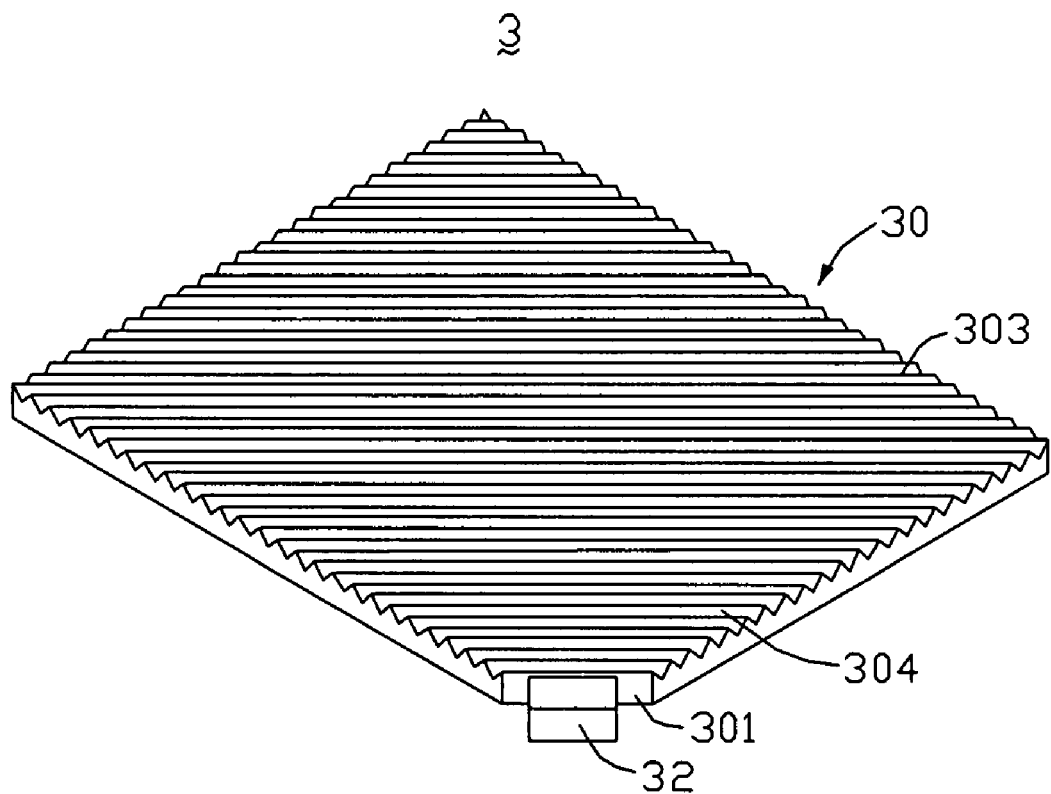
FIG. 5 is an inverted, isometric view of a backlight module according to a third embodiment of the present invention.

Referring to FIG. 5, a backlight module 3 according to a third embodiment of the present invention is similar in principle to the backlight module 1. The backlight module 3 includes a light guide plate 30 and a light source 32. The light guide plate 30 is essentially rectangular; except that one corner (not labeled) of the light guide plate 30 is truncated, thereby forming an oblique light incident surface 301. The light guide plate 30 includes the light incident surface 301, a bottom surface 303 perpendicular to the light incident surface 301, and a plurality of parallel reflective structures 304 integrally formed at the bottom surface 303. The light source 32 is located at the truncated corner, adjacent to the light incident surface 301. The reflective structures 304 are parallel to each other, are parallel to the light incident surface 301, and are continuously arranged one adjacent to the other. A pitch between each two adjacent reflective structures 304 is constant. The backlight module 3 has advantages similar to those described above in relation to the backlight module 1.

Figure 6:
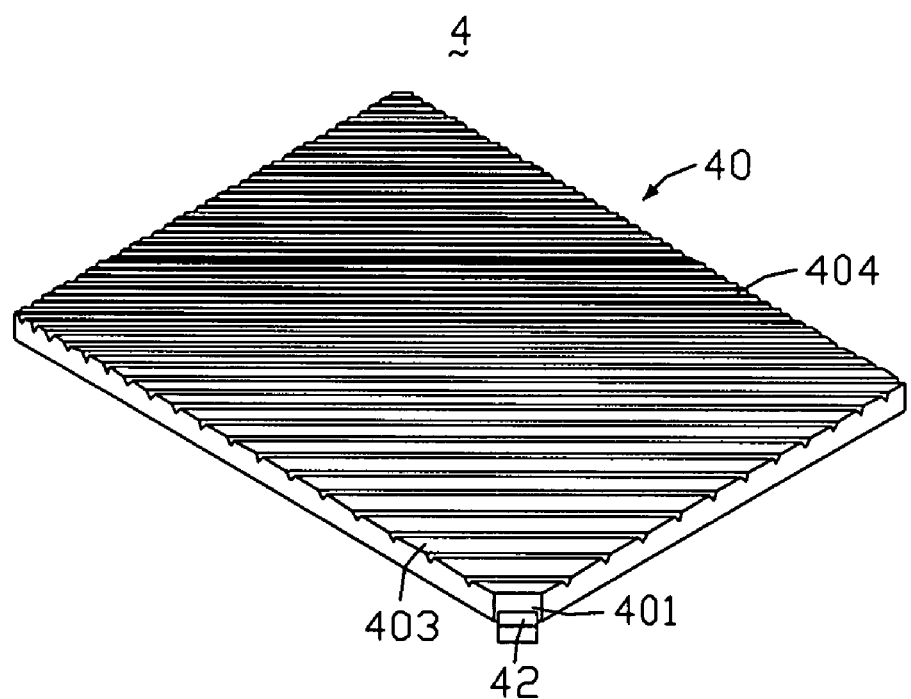
FIG. 6 is an inverted, isometric view of a backlight module according to a fourth embodiment of the present invention.

Referring to FIG. 6, a backlight module 4 according to a fourth embodiment of the present invention is similar to the backlight module 3. However, the backlight module 4 includes a light guide plate 40 and a light source 42. The light guide plate 40 is essentially rectangular; except that one corner (not labeled) of the light guide plate 40 is truncated, thereby forming an oblique light incident surface 401. The light guide plate 40 includes the light incident surface 401, a bottom surface 403 perpendicular to the light incident surface 401, and a plurality of parallel reflective structures 404 integrally formed at the bottom surface 403. The light source 42 is located at the truncated corner, adjacent to the light incident surface 401. The reflective structures 404 are discontinuously arranged. In particular, a pitch between each two adjacent reflective structures 404 progressively decreases with increasing distance away from the light incident surface 401. The backlight module 4 has advantages similar to those described above in relation to the backlight module 2.

Figure 7:
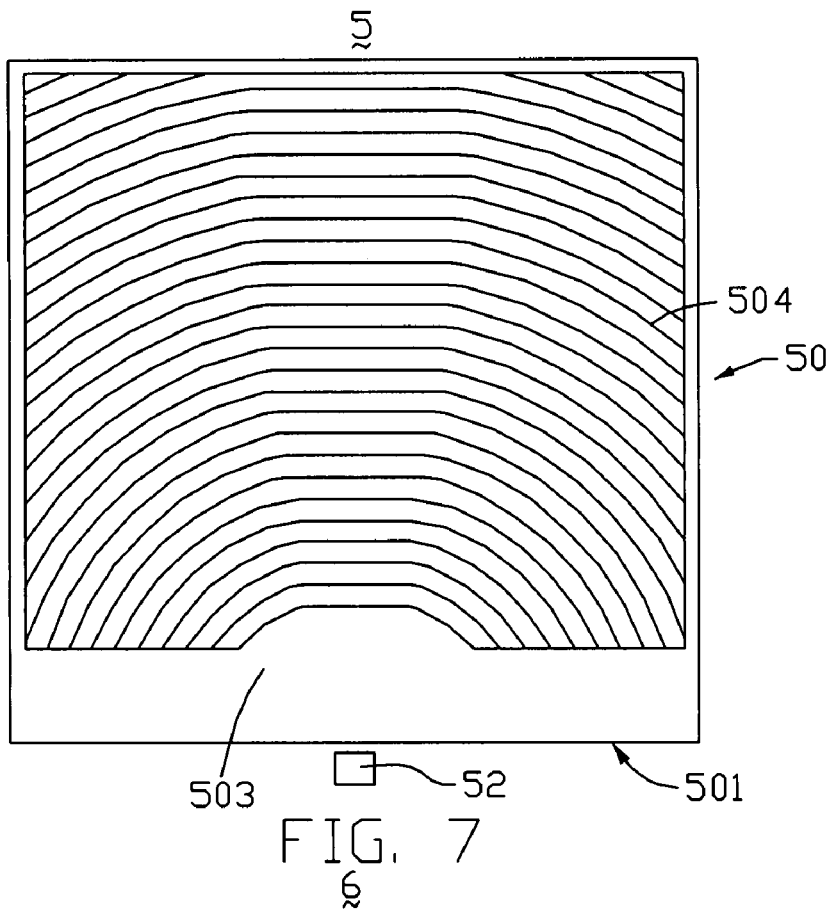
FIG. 7 is a bottom plan view of a backlight module according to a fifth embodiment of the present invention.

Referring to FIG. 7, a backlight module 5 according to a fifth embodiment of the present invention is similar to the backlight module 1. The backlight module 5 includes a light guide plate 50 and a light source 52. The light guide plate 50 includes a light incident surface 501, a bottom surface 503 perpendicular to the light incident surface 501, and a plurality of substantially parallel reflective structures 504 integrally formed at the bottom surface 503. Each of the reflective structures 504 includes a central straight portion (not labeled), and two symmetrically opposite arc-shaped portions (not labeled) extending from opposite ends of the straight portion respectively. The straight portion is parallel to the light incident surface 501. The arc-shaped portions lie on a same arc of an imaginary circle. That is, the arc-shaped portions subtend a common center. Further, the arc-shaped portions of all the reflective structures 504 subtend the same common center (not labeled). The light source 52 is located adjacent to the light incident surface 501, substantially at the common center subtended by all the arc-shaped portions. In the illustrated embodiment, lengths of the straight portions progressively increase with increasing distance away from the light incident surface 501. A pitch between each two adjacent reflective structures 504 is constant. The backlight module 5 has advantages similar to those described above in relation to the backlight module 1.

Figure 8:
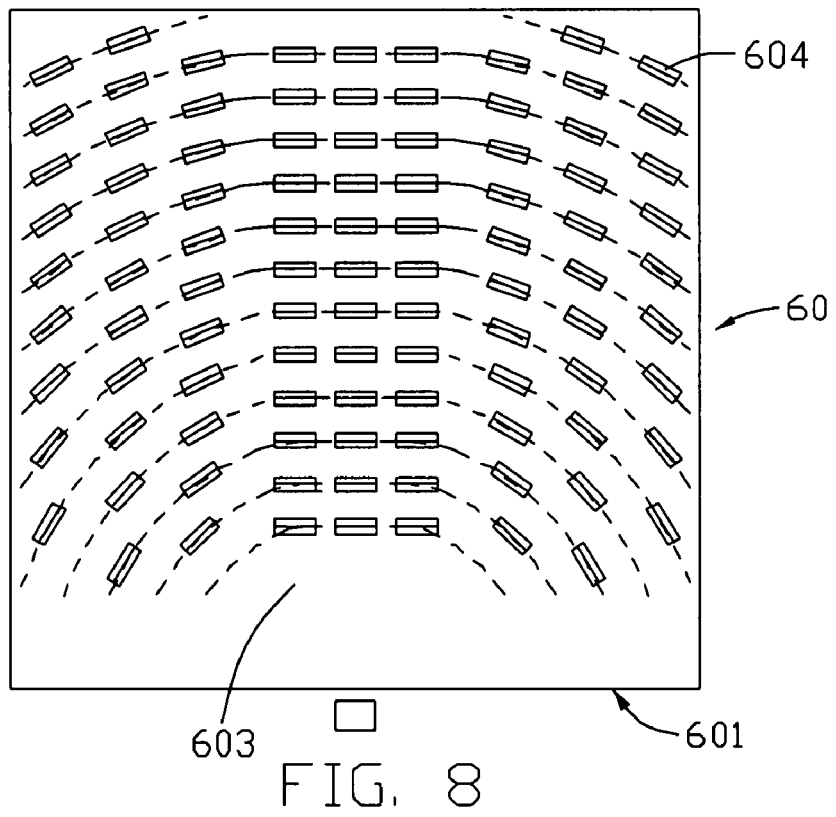
FIG. 8 is a bottom plan view of a backlight module according to a sixth embodiment of the present invention.

Referring to FIG. 8, a backlight module 6 according to a sixth embodiment of the present invention is similar to the backlight module 5. The backlight module 6 includes a light guide plate 60 and a light source (not labeled). The light guide plate 60 includes a light incident surface 601, a bottom surface 603 perpendicular to the light incident surface 601, and a plurality of reflective structures 604 integrally formed at the bottom surface 603. The reflective structures 603 are arranged along a plurality of imaginary linear tracks (marked with dashed lines in FIG. 8). The tracks are shaped corresponding to shapes of the reflective structures 504 of the light guide plate 50 of the backlight module 5.

Along a representative one of the tracks, the reflective structures 604 include a plurality of first reflective structures (not labeled) and a plurality of second reflective structures (not labeled). The first reflective structures are rectilinear, and are arranged along a central straight portion of the track. That is, the first reflective structures are aligned with each other, and are uniformly spaced apart from each other. The second reflective structures are also rectilinear, and are arranged along two symmetrically opposite arc-shaped portions of the track. The second reflective structures on each arc-shaped portion of each track are non-uniformly spaced apart from each other. Further, the second reflective structures on the two arc-shaped portions of the track are symmetrically opposite each other. The first reflective structures and the second reflective structures are separate from each other. Each of the first reflective structures defines a groove, with a shape of the groove being a triangular prism. That is, a transverse cross-section of the first reflective structure across the groove defines an isosceles triangle. Each of the second reflective structures is shaped the same as each of the first reflective structures. The light source is located adjacent to the light incident surface 601, substantially at the common center subtended by all the tracks. Each of the first reflective structures directly faces the light incident surface 601, and each of the second reflective structures directly faces the light source. A pitch between each two adjacent tracks is constant. In the illustrated embodiment, there are three first reflective structures along the straight portion of each track. That is, all the tracks have the same number of first reflective structures.

Figure 9:
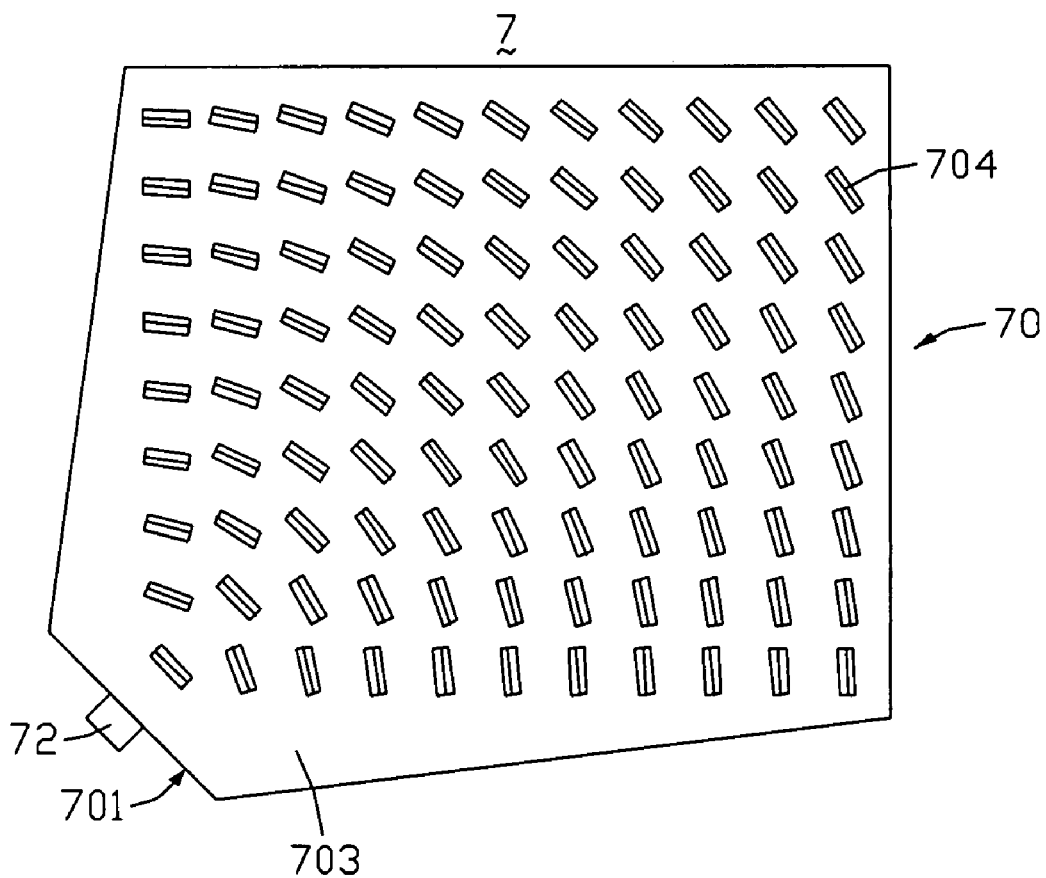
FIG. 9 is a bottom plan view of a backlight module according to a seventh embodiment of the present invention.

Referring to FIG. 9, a backlight module 7 according to a seventh embodiment of the present invention is similar to the backlight module 6. The backlight module 7 includes a light guide plate 70 and a light source 72. The light guide plate 70 is essentially pentagonal. A shortest side of the light guide plate 70 forms a light incident surface 701. The light guide plate 70 includes the light incident surface 701, a bottom surface 703 perpendicular to the light incident surface 701, and a plurality of reflective structures 704 integrally formed at the bottom surface 703.

The configuration and arrangement of the reflective structures are similar to the configuration and arrangement of the reflective structures 604 of the light guide plate 60 of the backlight module 6. In particular, each of the reflective structures directly faces the light source 72.

Figure 10:
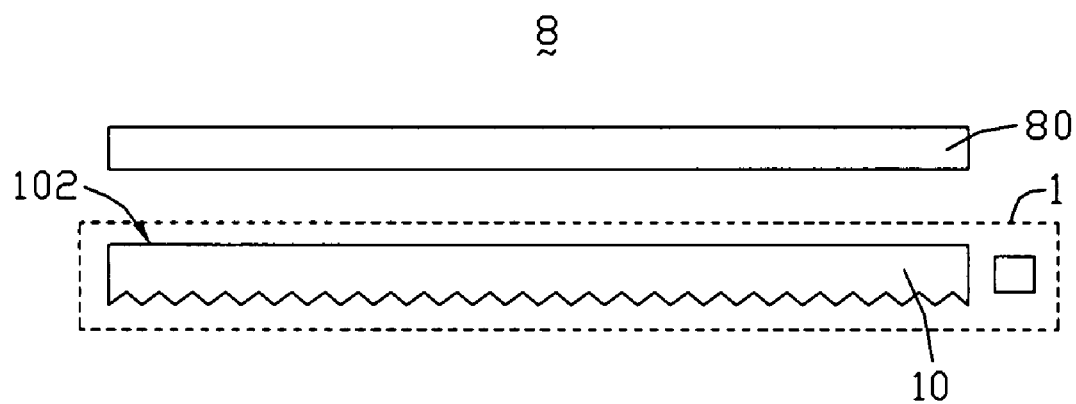
FIG. 10 is an exploded, side plan view of a liquid crystal display according to an eighth embodiment of the present invention, the liquid crystal display including the backlight module of FIG. 1.
Figure 11:
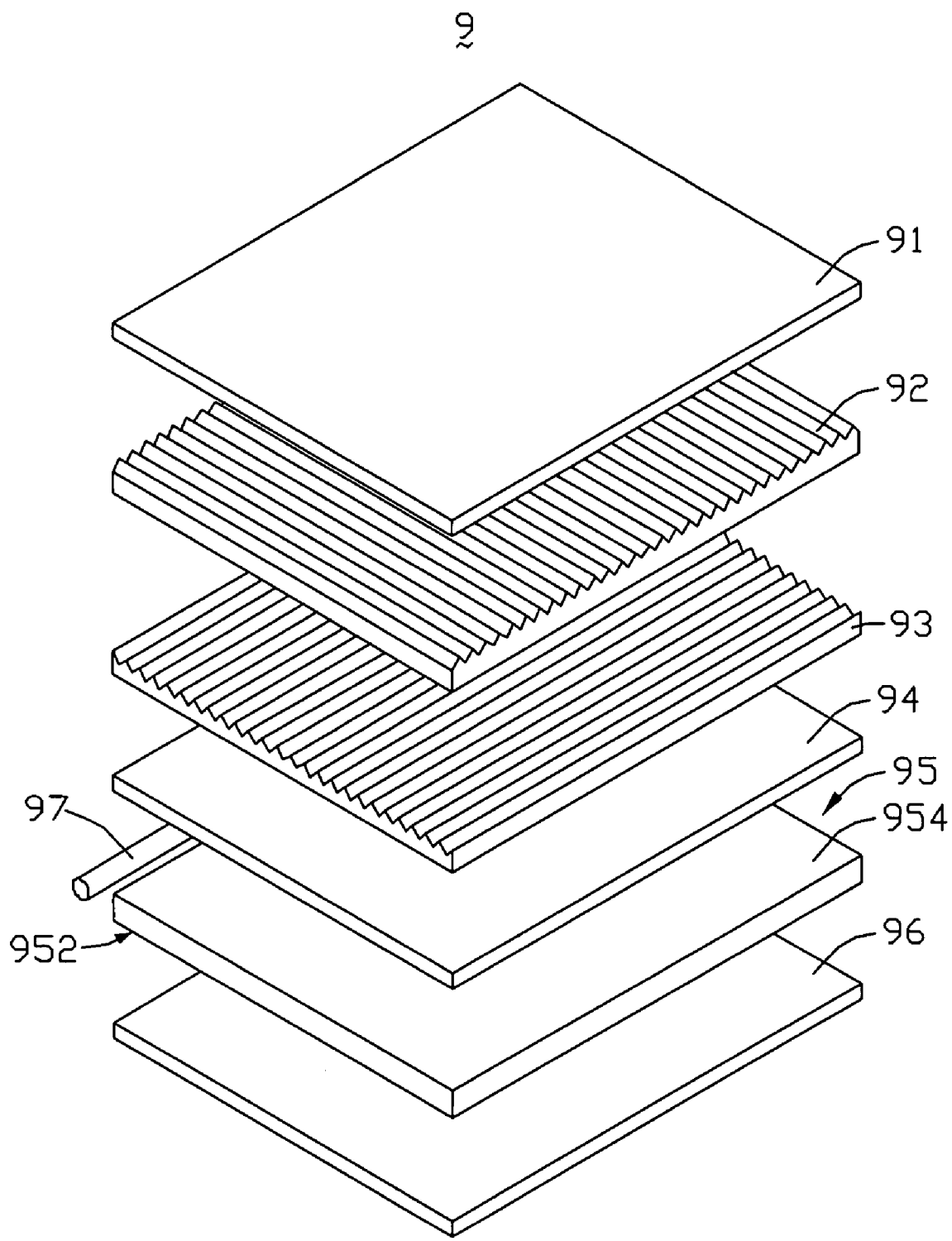
FIG. 11 is an exploded, isometric view of a conventional backlight module.

Referring to FIG. 10, a liquid crystal display 8 according to an eighth embodiment of the present invention is shown. The liquid crystal display 8 includes a liquid crystal panel 80 and the backlight module 1. The light emitting surface 102 of the light guide plate 10 of the backlight module 1 is adjacent to the liquid crystal panel 80. In alternative embodiments, the backlight module 1 can be replaced with any one of the above-described backlight modules 2, 3, 4, 5, 6, 7.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a light guide plate comprising:
        a top light emitting surface;
        a bottom surface;
        a light incident surface perpendicular to the bottom surface; and
        a plurality of reflective structures at the bottom surface, the reflective structures substantially defining a plurality of isosceles triangular profiles, wherein each of the reflective structures maintains a pair of base angles relative to the bottom surface, the base angles of each reflective structure are the same, the base angles of all the reflective structures are the same, and the common base angle is in the range from 45° to 55°; and
    a light source arranged to provide light beams to the light guide plate;
    wherein the reflective structures are arranged along a plurality of imaginary tracks, and each of the tracks comprises a straight portion and two arc-shaped portions extending from two opposite ends of the straight portion.

2. The backlight module as claimed in claim 1, wherein the common base angle is selected from the group consisting of approximately 45°, approximately 50°, and approximately 55°.

3. The backlight module as claimed in claim 1, wherein the light source is located adjacent to the light incident surface.

4. The backlight module as claimed in claim 1, wherein the reflective structures are parallel to each other, and a pitch between each two adjacent reflective structures is constant.

5. The backlight module as claimed in claim 1, wherein the light guide plate is essentially rectangular.

6. The backlight module as claimed in claim 1, wherein the straight portion is parallel to the light incident surface.

7. The backlight module as claimed in claim 6, wherein the arc-shaped portions lie on a same arc of an imaginary circle.

8. The backlight module as claimed in claim 7, wherein the arc-shaped portions subtend a common center, and the light source is located at the common center.

9. The backlight module as claimed in claim 1, wherein each of the reflective structures is arranged along a respective one of the imaginary tracks, and the reflective structures are continuously arranged one adjacent to the other.

10. The backlight module as claimed in claim 1, wherein each of the reflective structures is in the form of a groove defined in the light guide plate at the bottom surface, and the reflective structures are discontinuously arranged along the length of each of the tracks.

11. The backlight module as claimed in claim 1, wherein lengths of the straight portions progressively increase with increasing distance away from the light incident surface.

12. A liquid crystal display comprising:
    a liquid crystal panel; and
    a backlight module located adjacent to the liquid crystal panel, the backlight module comprising:
        a light guide plate comprising:
            a top light emitting surface;
            a bottom surface;
            a light incident surface perpendicular to the bottom surface; and
            a plurality of reflective structures at the bottom surface, the reflective structures substantially defining a plurality of isosceles triangular profiles, wherein each of the reflective structures maintains a pair of base angles relative to the bottom surface, the base angles of each reflective structure are the same, the base angles of all the reflective structures are the same, and the common base angle is in the range from 45° to 55°; and
        a light source arranged to provide light beams to the light guide plate;
    wherein the reflective structures are arranged along a plurality of imaginary tracks, and each of the tracks comprises a straight portion and two arc-shaped portions extending from two opposite ends of the straight portion.

13. The liquid crystal display as claimed in claim 12, wherein the straight portion is parallel to the light incident surface.

14. The liquid crystal display as claimed in claim 13, wherein the arc-shaped portions lie on a same arc of an imaginary circle.

15. The liquid crystal display as claimed in claim 14, wherein the arc-shaped portions subtend a common center, and the light source is located at the common center.

16. The liquid crystal display as claimed in claim 12, wherein the tracks are substantially parallel to each other, and lengths of the straight portions of the tracks progressively increase with increasing distance away from the light incident surface.

17. The liquid crystal display as claimed in claim 12, wherein the common base angle is selected from the group consisting of approximately 45°, approximately 50°, and approximately 55°.

18. The liquid crystal display as claimed in claim 12, wherein the reflective structures are substantially parallel to each other, and a pitch between each two adjacent reflective structures is constant.

19. The liquid crystal display as claimed in claim 12, wherein each of the reflective structures is arranged along a respective one of the imaginary tracks, and the reflective structures are continuously arranged one adjacent to the other.

20. The liquid crystal display as claimed in claim 12, wherein each of the reflective structures is in the form of a rectilinear groove defined in the light guide plate at the bottom surface, and the reflective structures are discontinuously arranged along the length of each of the tracks.

* * * * *